A. E. THORNE.
SPRING SUSPENSION FOR VEHICLES.
APPLICATION FILED FEB. 17, 1920.
Patented Oct. 24, 1922.
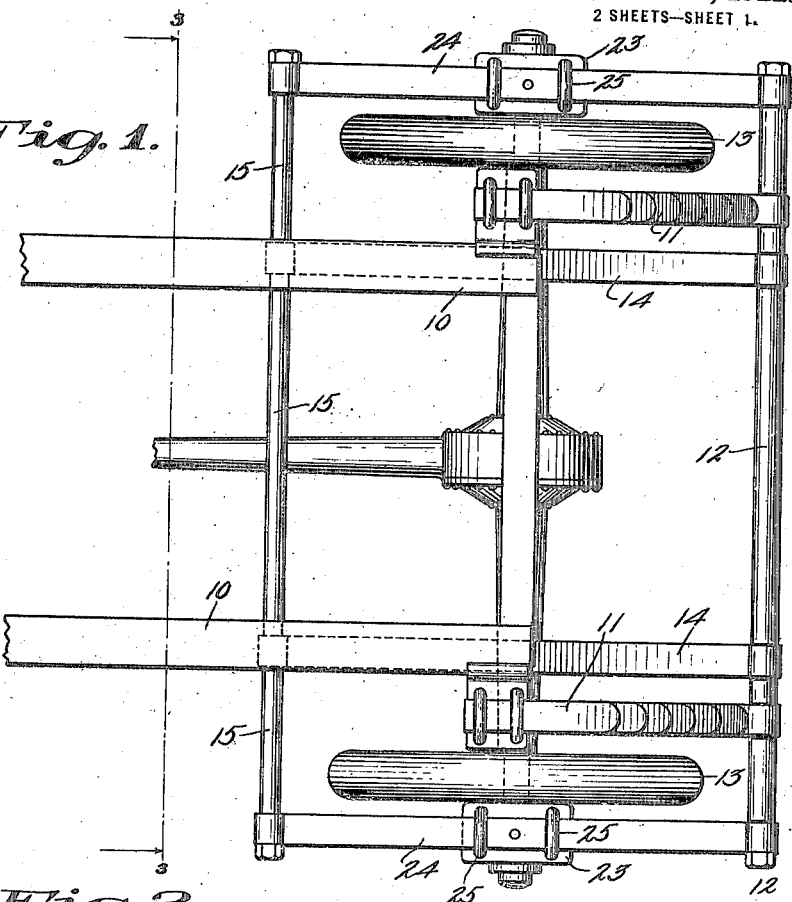
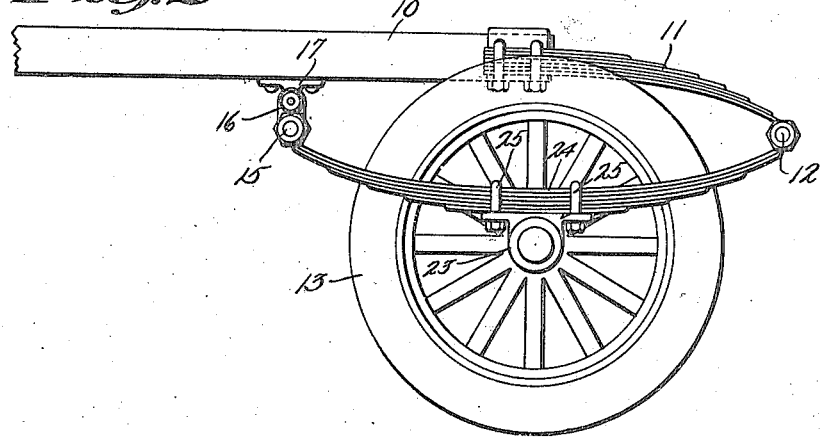
INVENTOR
ARTHUR EDWARD THORNE, A. E. THORNE.
SPRING SUSPENSION FOR VEHICLES.
APPLICATION FILED FEB. 17, 1920.
1,433,432.
Patented Oct. 24, 1922.
2 SHEETS—SHEET 2.
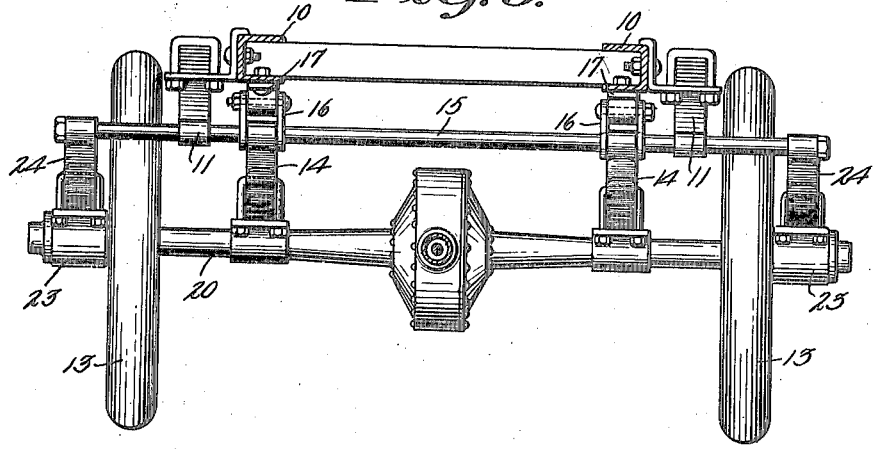
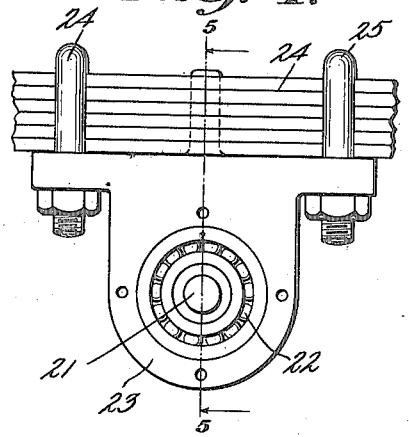
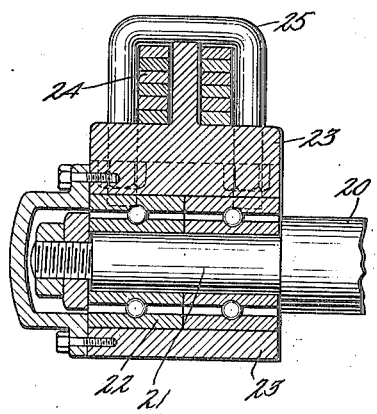
WITNESSES
INVENTOR
ARTHUR EDWARD THORNE,
BY
ATTORNEYS Patented Oct. 24, 1922.

1,433,432

UNITED STATES PATENT OFFICE.

ARTHUR EDWARD THORNE, OF NEW YORK, N. Y.

SPRING SUSPENSION FOR VEHICLES.

Application filed February 17, 1920. Serial No. 359,472.

*To all whom it may concern:*

Be it known that I, ARTHUR EDWARD THORNE, a subject of the King of Great Britain, and resident of the city of New York, borough of Manhattan, in the county and State of New York, have invented a new and Improved Spring Suspension for Vehicles, of which the following is a full, clear, and exact description.

The object of the invention is to provide a new and improved spring suspension for automobiles, auto-trucks and other vehicles, and arranged to insure easy riding in the vehicle and to reduce side skidding to a minimum.

Another object is to permit the use of solid tires on the rear wheels, at the same time insuring as comfortable riding as if the vehicle was equipped with pneumatic tires and shock absorbers.

Another object is to dispense with shock absorbers and similar contrivances, at the same time to relieve the driving mechanism of undue jolts and jars.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the improved spring suspension as applied to the rear portion of a chassis;

Figure 2 is a side elevation of the same;

Figure 3 is a cross section of the same on the line 3—3 of Figure 1;

Figure 4 is an enlarged side elevation of one of the ball bearings for the rear axle; and Figure 5 is a cross section of the same on the line 5—5 of Figure 4.

The frame 10 of the vehicle is connected by the springs 11 with a transverse rod 12 extending transversely across the rear of the vehicle and projecting beyond the sides of the rear wheels 13 of the vehicle. The rod 12 is connected by springs 14 with a transverse rod 15 hung by a link 16 from brackets 17 attached to the side beams of the frame 10 in front of the rear wheels 13. The rod 15 projects beyond the rear wheels 13 the same as the rod 12. The axle 20 of the rear wheels 13 is provided with end extensions 21 engaged by ball bearings 22 of any approved construction, and the ball bearings are mounted in casings 23 on which rest the middle portions of springs 24 fastened in place on the casings 23 by clips 25. The ends of the springs 24 are connected with the rods 12 and 15. It will be noticed that by the arrangement described, the usual spring suspension formed of the springs 11 and 14 is arranged within the wheel base while the auxiliary spring suspension formed of the springs 24 is arranged outside of the wheel base on the outer sides of the rear wheels 13. By this auxiliary spring suspension the weight of the car body and its occupants is distributed to both the main and the auxiliary spring suspensions and as the auxiliary spring suspension is located outside of the wheel base it is evident that sidewise skidding of the rear wheels 13 is reduced to a minimum.

It will also be noticed that by the use of the two springs 14 and 24, light springs may be used, which insures a more flexible suspension than a single heavy spring and thereby easy and comfortable riding in the vehicle is insured and shock absorbers are dispensed with. It will further be noticed that by the use of the main and auxiliary spring suspensions shown and described the rear wheels 13 may be equipped with solid tires instead of pneumatic tires without diminishing the comfortable riding qualities of the vehicle.

The auxiliary spring suspension may be readily applied to cars as now generally constructed.

Having thus described my invention, I claim as new and desire to secure by Letters Patent:

1. In a vehicle, a rear axle, wheels on the axle, the axle projecting beyond the wheels, a main spring suspension located within the wheel base of the vehicle and having transverse rods projecting beyond the rear wheels, one in front and the other in rear of the axle bearings mounted on the projecting ends of the axle outside the wheels, and springs mounted on the said bearings and connected with the said rods.

2. In a vehicle, a frame having front and rear transverse rods projecting beyond the rear wheels, the front rod having link connections with the frame, an axle, wheels on the axle, the axle projecting beyond the wheels, springs secured to one of the rear rod within the vehicle, and springs secured to the axle and to the said rods outside of the wheels.

3. In a vehicle, a frame, a rear axle, wheels on the axle, the axle projecting beyond the wheels, transverse rods, one of which is connected to the frame by links and the other to the frame by springs, bearings on the projecting ends of the axle, and springs secured to the bearings and their ends to said rods.

4. In a vehicle, a rear axle, a frame having transverse rods, the front one of which is connected to the frame by links, ball bearings mounted on the outer ends of the rear axle, springs clipped to the said ball bearings and having their ends connected with the said rods, and springs secured to said rods within the wheel base.

5. In a vehicle, a frame, an axle mounted in the frame, wheels on the axle, the axle projecting beyond the wheels, rearwardly projecting springs having one end secured to the frame, a rod in rear of the axle and secured to the other ends of the springs, a rod having link connections with the frame in front of the axles, the said rods projecting beyond the wheels, springs secured to said rods intermediate of their ends, and springs mounted upon the projecting ends of the axle and having their ends secured to the ends of the rods.

ARTHUR EDWARD THORNE.